US006072784A

United States Patent [19]

Agrawal et al.

[11] Patent Number: 6,072,784

[45] Date of Patent: Jun. 6, 2000

[54] CDMA MOBILE STATION WIRELESS TRANSMISSION POWER MANAGEMENT WITH ADAPTIVE SCHEDULING PRIORITIES BASED ON BATTERY POWER LEVEL

[75] Inventors: Prathima Agrawal, New Providence, N.J.; Jyh-Cheng Chen, Tonawanda, N.Y.; Shalinee Kishore, Dayton, N.J.; Krishna M. Sivalingam, Greensboro, N.C.

[73] Assignee: AT&T Corp., New York, N.Y.

[21] Appl. No.: 08/900,802

[22] Filed: Jul. 25, 1997

[51] Int. Cl.[7] ............................ G08C 17/00; H04B 7/216

[52] U.S. Cl. .......................... 370/311; 370/335; 370/343; 455/69; 455/522

[58] Field of Search .................................... 370/311, 318, 370/322, 329, 332, 335, 343, 348, 437, 441, 443; 455/522, 512, 69, 574, 527, 572

[56] References Cited

U.S. PATENT DOCUMENTS

| | | | |
|---|---|---|---|
| 5,226,071 | 7/1993 | Bolliger et al. | 455/435 |
| 5,574,979 | 11/1996 | West | 455/63 |
| 5,752,193 | 5/1998 | Scholefield et al. | 455/452 |
| 5,754,537 | 5/1998 | Jamal | 370/330 |
| 5,854,787 | 12/1998 | Dodge et al. | 370/349 |
| 5,901,361 | 5/1999 | Luong | 455/517 |

*Primary Examiner*—Chau Nguyen
*Assistant Examiner*—Soon-Dong Hyun

[57] ABSTRACT

A method adapts scheduling priorities in a CDMA wireless communications system to conserve battery power in mobile terminals operating within the system. A base station, within the system, receives battery power level information and other setup information from mobile terminals operating within the service area of the base station during call setup procedures. Based on the battery power level information and other setup information, the base station adapts scheduling priorities for the mobile terminals to expedite wireless transmissions from those mobile terminals reporting low battery power levels. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

24 Claims, 9 Drawing Sheets

CDMA MOBILE STATION WIRELESS TRANSMISSION POWER MANAGEMENT WITH ADAPTIVE SCHEDULING PRIORITIES BASED ON BATTERY POWER LEVEL

TECHNICAL FIELD

This invention relates to telecommunications, and more particularly to a method and apparatus for managing mobile stations in a wireless network.

BACKGROUND

Code Division Multiple Access (CDMA) protocol involves the use of a unique code to distinguish each user's data signal from other users' data signals. Knowledge of the unique code with which any specific information is transmitted, permits the separation and reconstruction of each user's message at the receiving end of the communication channel. There are two principal types of CDMA protocols, classified by the specific technique that is used to spread the user's data over a wide portion of the frequency spectrum: direct sequence (or pseudo-noise) and frequency hopping systems. The technical foundations for CDMA protocols are discussed, for example, in the recent book by Prasad entitled "CDMA for Wireless Personal Communications", Artech House, 1996.

The Direct Sequence CDMA (DS-CDMA) protocol involves the spreading of a user's data signal over a wide portion of the frequency spectrum by modulating the data signal with a unique code signal that is of higher bandwidth than the data signal. The frequency of the code signal is chosen to be much larger than the frequency of the data signal. The data signal is directly modulated by the code signal and the resulting encoded data signal modulates a single, wideband carrier that continuously covers a wide frequency range. After transmission of the DS-CDMA modulated carrier signal, the receiver uses a locally generated version of the user's unique code signal to demodulate the received signal and obtain a reconstructed data signal. The receiver is thus able to extract the user's data signal from a modulated carrier that bears many other users' data signals.

The Frequency Hopping CDMA (FH-CDMA) protocol involves the use of a unique code to change the value of a narrowband carrier frequency for successive bursts of the user's data signal. The value of the carrier frequency varies in time over a wide range of the frequency spectrum in accordance with the unique code. CDMA protocols are closely related to spread spectrum technology and the term Spread Spectrum Multiple Access (SSMA) is also used for CDMA protocols such as DS-CDMA and FH-CDMA that use a relatively wide frequency range over which to distribute a relatively narrowband data signal.

Mobile stations operating with the CDMA protocol transmit under strict power control. One of the implications of spreading a message signal over a wide band is that each transmitted signal must received by the base station at similar power levels. Thus, mobile stations that are located farther away from the base station must transmit their signals at a much higher power level than mobile stations near a base station, so that both signals may be received at the base station at equivalent power levels. The base station and the mobile stations operating with the CDMA protocol use a power control algorithm consisting of open-loop and closed-loop power control methods, to control the transmission power at the mobile stations.

In open-loop power control, each mobile station measures the signal power of the down-link message it received from the base station. Based on this measurement, and based on a prescribed target value, the mobile station then computes how much to adjust its own transmission power to achieve the desired received power level at the base station.

In closed-loop power control, the base station receives each mobile station's signal and measures its received power level. The base station determines if each received power level matches a target value for received power level. Then, based on this determination, the base station periodically transmits a power control message to each mobile station, multiplexing it with the down-link data. The power control message indicates to the mobile if it should increase or decrease its transmitted power so as to maintain the desired received power level at the base station.

The final transmit power adjustment performed by the mobile station is based on the combination of the open-loop and the closed-loop power control methods. The mobile station computes how much it has to increase or decrease its transmit power level on the open loop-measurement. It then listens to the base station's power control message to determine the closed-loop adjustment The mobile station then adds the open-loop adjustment and the closed loop adjustment to compute its resultant transmit power adjustment.

Currently, battery power conservation for mobile terminals operating in a wireless communications system is a significant concern, especially for wireless service providers. This is due primarily to the significant amounts of power expended for wireless transmission by the mobile terminal transmitter. Revenue cannot be generated if mobile terminals cannot complete calls due to their battery power being exhausted. One manual solution is the use of auxiliary power adapters to provide the power source needed for operation of the mobile terminal. However, this solution burdens wireless subscribers with additional costs and requires them to maintain a close proximity of the mobile terminal to the power source, to guarantee wireless service. Passive solutions to the problem involve scheduling the mobile terminal for sleep mode operation. The mobile terminal is instructed by the servicing base station to "wake up" at predetermined intervals to receive RF transmissions from the base station and to transmit RF signals to the base station. Although this solution does provide some relief, it also leads to significant over-the-air delays in the communications link since the base station and mobile terminal must continually buffer messages. This delay is magnified further in a wireless communications system that operates on a reservation based protocol. Such a protocol directs mobile terminals to use a limited number of channels at specific times to reduce interference and collisions in the wireless link.

Due to the limitations of the prior art, there is a need for a solution that takes a more active, direct role in managing mobile terminals operating with low battery power levels.

SUMMARY

In accordance with the invention, scheduling priorities in a CDMA wireless communications system are adapted to conserve battery power in mobile terminals operating within the system. The transmit power of all mobile stations is controlled by the base station to optimally conserve the battery power of a particular mobile station reporting a low battery condition. In a preferred embodiment, a base station, within the system, receives battery power level information and other setup information from mobile terminals operating within the service area of the base station during call setup procedures. Based on the battery power level information and other setup information, the base station adapts scheduling priorities for the mobile terminals to expedite wireless transmissions from those mobile terminals reporting low battery power levels. In accordance with the invention, the base station schedules the transmissions from low battery power mobile stations to be clustered together in one or more time slots, which are separate in time from the scheduled transmissions from high battery power mobile stations. The base station transmits a power control message to the low battery power mobile stations, to reduce the transmission power required for those mobile stations during the lowpower time slot. Thus, the low battery power mobile stations are able to conserve their batteries by transmitting at reduced power levels during the low-power time slot and the base station can receive the lower power signals during the low-power time slot without those signals being masked by the higher power signals transmitted from the high battery power mobile stations.

The inventive method begins by receiving at the base station a signal from a mobile station that its battery power is below a threshold value. In response to this, the base station changes a mobile transmission schedule to cause transmission of messages from the mobile station to occur before transmission of messages from other stations. The base station schedules the transmissions from low battery power mobile stations to be clustered together in a low-power time slot which is separate in time from the scheduled transmissions from high battery power mobile stations. There will be more than one slot allotted for low-power mobiles. The base station transmits a power control message to the low battery power mobile stations, to reduce the transmission power required for those mobile stations during the low-power time slot. The base station then transmits the schedule to the mobile stations. By advancing the scheduled transmission of messages from a mobile station whose battery power is low, those messages have a higher probability of successful transmission before the battery power level diminishes further.

In a further aspect of the invention, the mobile station can have a high priority message and a low priority message to transmit. In accordance with the invention, the base station changes the mobile transmission schedule to cause transmission of the high priority message of low power mobile, to occur before transmission of high priority messages from other stations and to cause transmission of the low priority message of low power to occur before transmission of low priority messages from other stations, but not before the transmission of high priority messages from other stations. The base station schedules the transmissions from low battery power mobile stations to be clustered together (in a low-power time slot) which is separate in time from the scheduled transmissions from high battery power mobile stations. The base station transmits a power control message to the low battery power mobile stations, to reduce the transmission power required for those mobile stations during the low-power time slots.

In still a further aspect of the invention, a first mobile station can have a first high priority message and a first low priority message to transmit and can have its battery power below a first threshold value. The base station can also receive a signal from a second mobile station that its battery power is below a second threshold value greater than the first threshold value. The second mobile station can have a second high priority message and a second low priority message to transmit. In accordance with the invention, the base station changes the mobile transmission schedule to cause transmission of the messages to be ordered with the first high priority, followed by the second high priority, followed by high priority messages from other stations, followed by the first low priority, followed by the second low priority, followed by low priority messages from other stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the lowpower time slot.

In yet a further aspect of the invention, the inventive method defines at least a portion of a code division multiple access frame with a first time slot for the messages from the low power mobile station to occur before a second time slot for the messages from the other stations. The mobile station can have a high priority message and a low priority message to transmit. In accordance with the invention, the base station changes the mobile transmission schedule to define at least a portion of a code division multiple access frame with a first time slot for the high priority message to occur before a second time slot for high priority messages from other stations, and with a third time slot for the low priority message to occur before a fourth time slot for low priority messages from other stations, but not before the second time slot for high priority messages from other stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the lowpower time slot.

In still a further aspect of the invention, the first mobile station can have a first high priority message and a first low priority message to transmit and it can have its battery power below a first threshold value. The base station can receive a signal from a second mobile station that its battery power is below a second threshold value greater than the first threshold value. The second mobile station can have a second high priority message and a second low priority message to transmit. In accordance with the invention, the base station changes the mobile transmission schedule to define at least a portion of a code division multiple access frame with a first time slot for the first high priority message, followed by a second time slot for the second high priority message, followed by a third time slot for the high priority messages from other stations, followed by a fourth time slot for the first low priority message, followed by a fifth time slot for the second low priority message, followed by a sixth time slot for the low priority messages from other stations. The base station schedules the transmissions from low battery power mobile stations to be clustered together in one or more low-power time slots which are separate in time from the scheduled transmissions from high battery power mobile stations. The base station transmits a power control message to the low battery power mobile stations, to reduce the transmission power required for those mobile stations during the low-power time slot.

In still a further aspect of the invention, the base station defines an up-link data sub-frame portion of a code division multiple access frame with a first time slot for the messages from the low battery power mobile station to occur before a second time slot for the messages from the other stations. The base station further defines a down-link subframe portion of the code division multiple access frame for messages from the base station to the mobile stations. The base station can selectively order the down-link subframe portion to occur either before or after the up-link data sub-frame portion. The base station further defines a down-link broadcast subframe portion of the code division multiple access frame for transmitting the schedule to the mobile stations. The base station further defines an up-link status sub-frame portion of the code division multiple access flame for the signal from the mobile station reporting its battery power status. The base station schedules the transmissions from low battery power mobile stations to be clustered together in one or more low-power time slots which is separate in time from the scheduled transmissions from high battery power mobile stations. The base station transmits a power control message to the low battery power mobile stations, to reduce the transmission power required for those mobile stations during the low-power time slot.

In still a further aspect of the invention, the mobile station has a high priority message queue and a low priority message queue. In accordance with the invention, the base station changes the mobile transmission schedule to cause transmission of high priority messages from the high priority message queue to occur before transmission of high priority messages from other stations and to cause transmission of low priority messages from the low priority message queue to occur before transmission of low priority messages from other stations, but not before the transmission of high priority messages from other stations. Further in accordance with the invention, the base station defines an up-link data sub-frame portion of a code division multiple access frame with a first time slot for the messages from the first mobile station to occur before a second time slot for the messages from the other stations, a down-link subframe portion of the code division multiple access frame for messages from the base station to the first and other stations, a down-link broadcast subframe portion of the code division multiple access frame for transmitting the schedule to the first and other stations, and an up-link status sub-frame portion of the code division multiple access frame for the signal from the first mobile station reporting its battery power status and its message queue status. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

In this manner, the invention takes a more active, direct role in managing mobile terminals operating with low battery power levels.

The discussion in this Summary and the following Brief Description of the Drawings, Detailed Description, and drawings only deal with examples of this invention and are not to be considered in any way a limitation on the scope of the exclusionary rights conferred by a patent which may issue from this application. The scope of such exclusionary rights is set forth in the claims at the end of this application.

DETAILED DESCRIPTION OF THE PREFERRED EMBODIMENTS

The invention disclosed herein solves the problem of efficient battery power consumption for mobile terminals operating in a wireless communications environment. Some of the main sources of power consumption are the transmitter, receiver, the CPU, and the disk. In accordance with the invention, instead of passively or indirectly conserving battery power through the use of sleep or standby modes, the invention actively conserves battery power by rescheduling the operations of the mobile terminal. In response to a low battery power level and other communications criteria reported by an active mobile terminal, the invention enables the mobile terminal to transmit on particular radio channels with higher priority than other mobile terminals having higher battery power levels. The base station schedules the transmissions from low battery power mobile stations to be clustered together in one or more low-power time slots which are separate in time from the scheduled transmissions from high battery power mobile stations. The base station transmits a power control message to the low battery power mobile stations, to reduce the transmission power required for those mobile stations during the low-power time slot.

Figure 1:
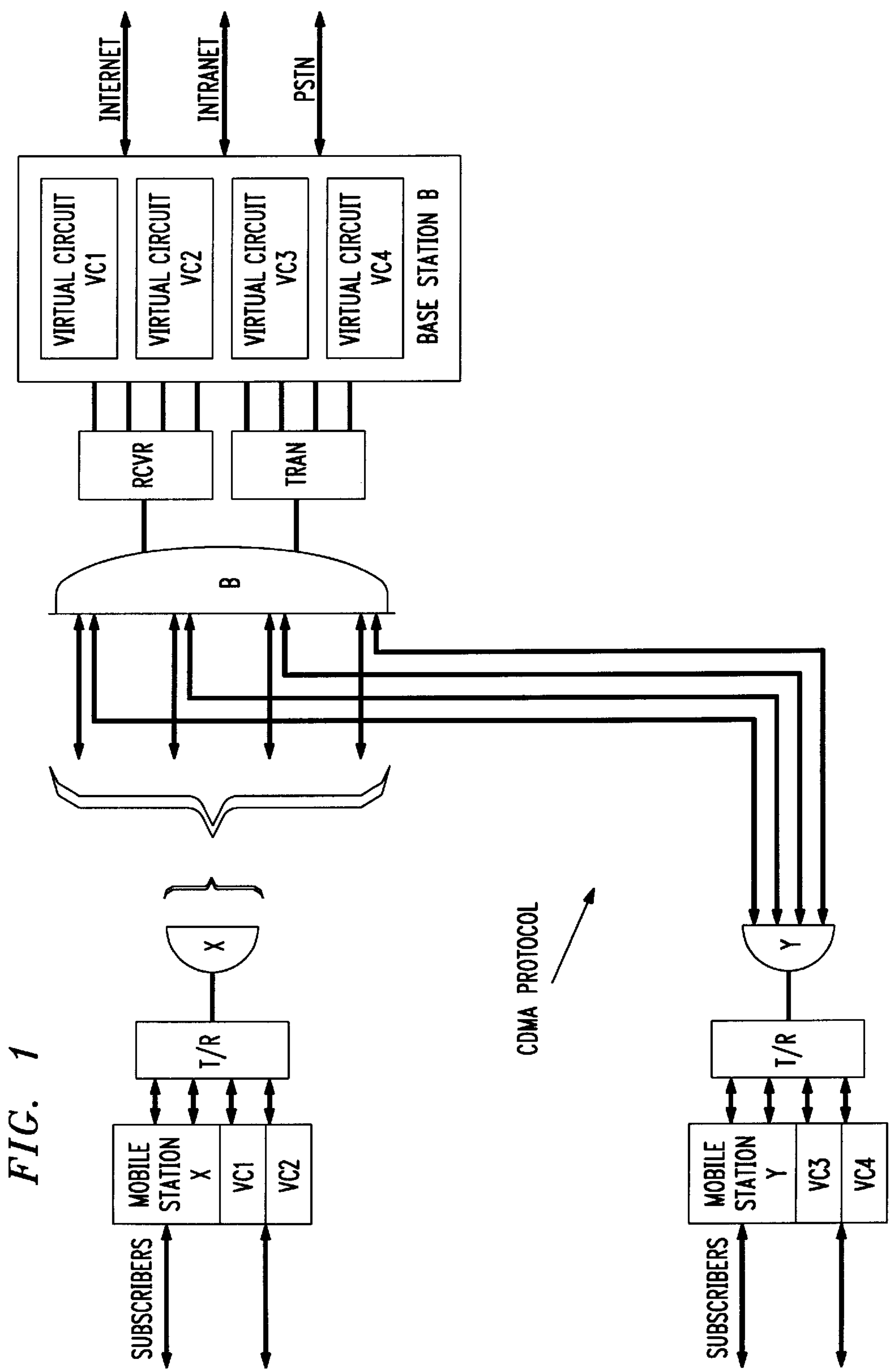
FIG. 1 is a network diagram of a CDMA wireless network, in accordance with the invention.

FIG. 1 is a network diagram of a CDMA wireless network, in accordance with the invention. Base station B exchanges voice, video and data message traffic with the internet, with intranet LANs and WANs, and with the public switched telephone network (PSTN). Base station B is shown communicating that message traffic over a CDMA wireless link with mobile station X and mobile station Y. Base station B communicates the voice and data message traffic with mobile station X using virtual circuits VC1 and VC2 and it communicates the voice, video and data message traffic with mobile station Y using virtual circuits VC3 and VC4. Base station B transmits messages over the wireless link with its transmitter (TRAN) and antenna "B" and receives messages over the wireless link with its receiver (RCVR) and antenna "B". Mobile station X transmits and receives messages for its subscriber over the wireless link using its transmitter/receiver (T/R) and antenna "X". Mobile station Y transmits and receives messages for its subscriber over the wireless link using its transmitter/receiver (T/R) and antenna "Y". In the preferred embodiment of the invention, base station B, mobile station X, and mobile station Y use a code division multiple access protocol to exchange messages over the wireless link.

Figure 2:
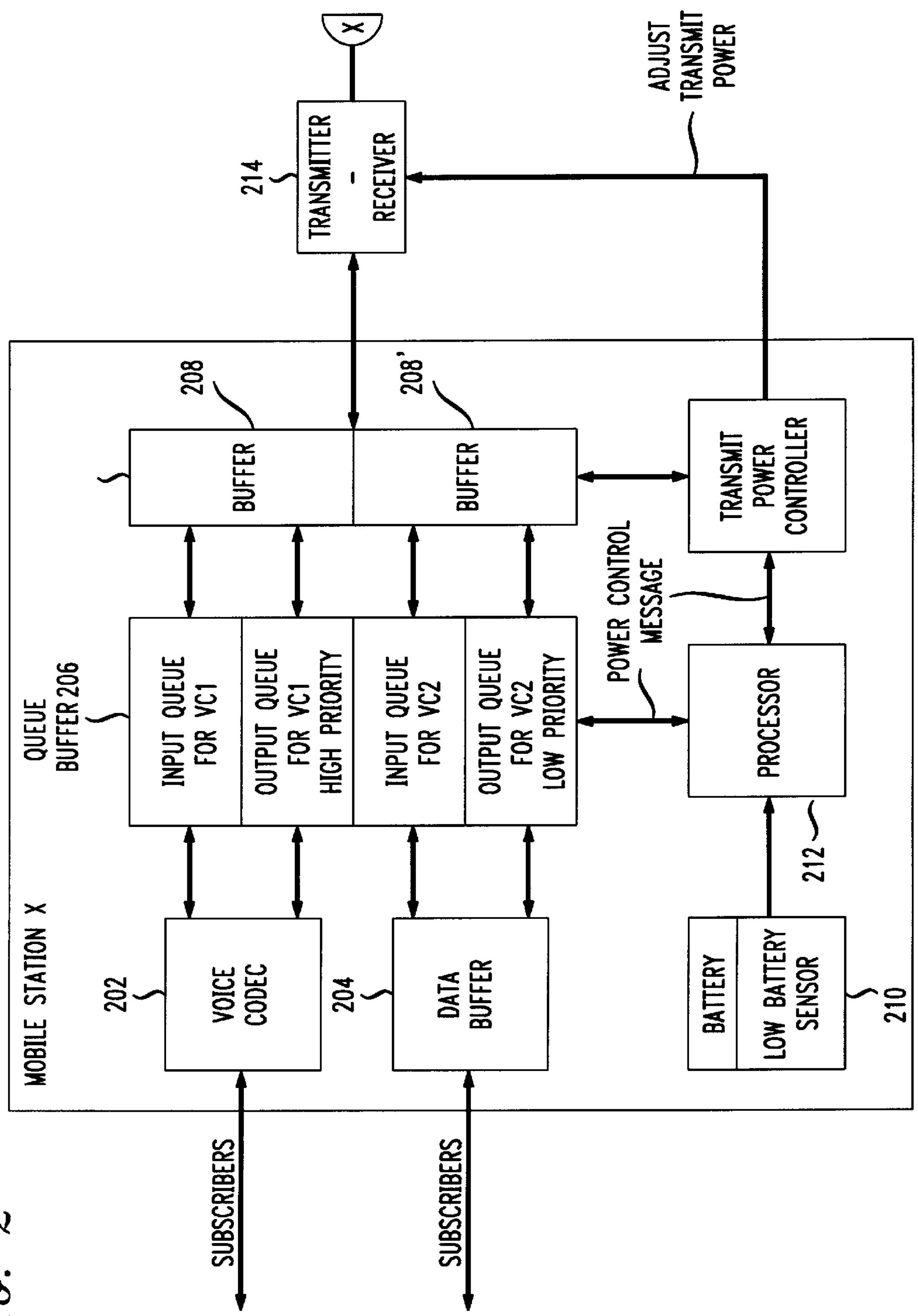
FIG. 2 is an architectural block diagram of the mobile station X, in accordance with the invention.

FIG. 2 is an architectural block diagram of the mobile station X, in accordance with the invention. A subscriber can exchange voice information using the voice CODEC 202 or data information using the data buffer 204. Both the voice CODEC 202 and the data buffer 204 have an interface to the queue buffer 206. The queue buffer 206 contains input and output queues for the virtual circuits VC1 and VC2. The output queue for VC1 is shown in a first example with a high priority and the output queue for VC2 is shown in the first example with a low priority. Outgoing messages in the output queues of buffer 206 are applied to the output buffer 208 for transmission by transmitter/receiver 214 to the base station B. Incoming messages in the input queues of buffer 206 are received from the input buffer 208', received by transmitter/receiver 214 from the base station B. The queue buffer 206 is controlled by the computer processor 212.

The battery that powers the mobile station X is monitored by the low battery sensor 210. The sensor 210 can measure the residual power level of the battery with a range of values. An example of a four increment range is "full power level", half-full power level, low power level, and nearly empty level. The measured residual power level of the battery is output by the sensor 210 to the processor 212. The processor 212 is programmed to prepare a battery status message in either the queue buffer 206 or in the output buffer 208, for transmission to the base station B. The battery status message includes the measured residual power level of the battery output by the sensor 210 to the processor 212. Queue status information can also be included in the battery status message, identifying the priority level of each virtual circuit output queue and other information. The battery status message can be prepared and sent on a periodic basis, or it can be sent only when a low battery condition is detected by the sensor 210.

Figure 3:
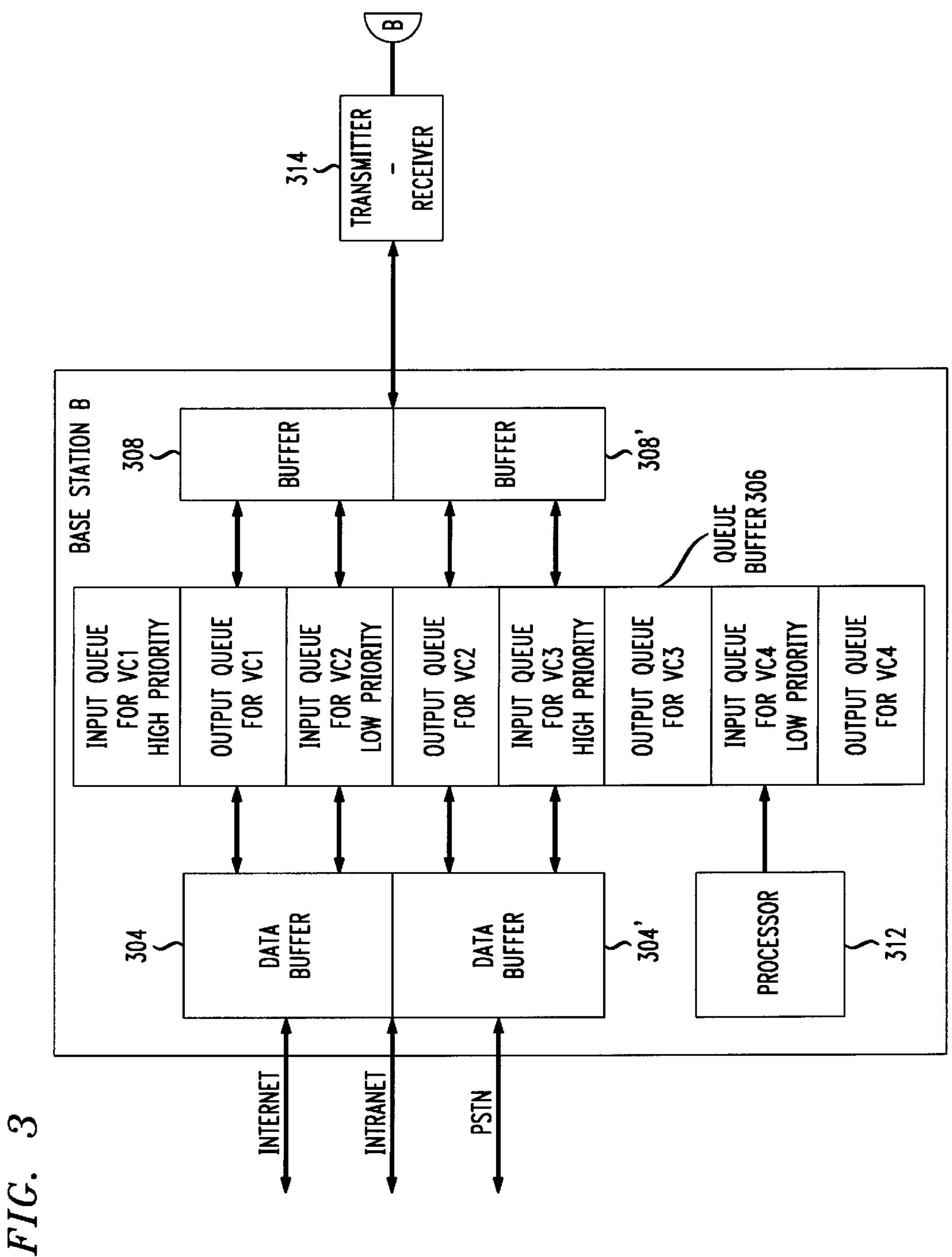
FIG. 3 is an architectural block diagram of the base station B, in accordance with the invention.

FIG. 3 is an architectural block diagram of the base station B, in accordance with the invention. Base station B uses input data buffer 304 and output data buffer 304' to exchange voice, video and data message traffic with the internet, with intranet LANs and WANs, and with the public switched telephone network (PSTN). Base station B communicates the voice, video and data message traffic with mobile station X using input and output queues in queue buffer 306 for virtual circuits VC1 and VC2. Base station B communicates the voice, video and data message traffic with mobile station Y using input and output queues in queue buffer 306 for virtual circuits VC3 and VC4. Outgoing messages in the output queues of buffer 306 are applied to the output buffer 308 for transmission by transmitter/receiver 314 to the mobile stations. Incoming messages in the input queues of buffer 306 are received from the input buffer 308', received by transmitter/receiver 314 from the mobile stations. The queue buffer 306 is controlled by the computer processor 312.

Figure 4:
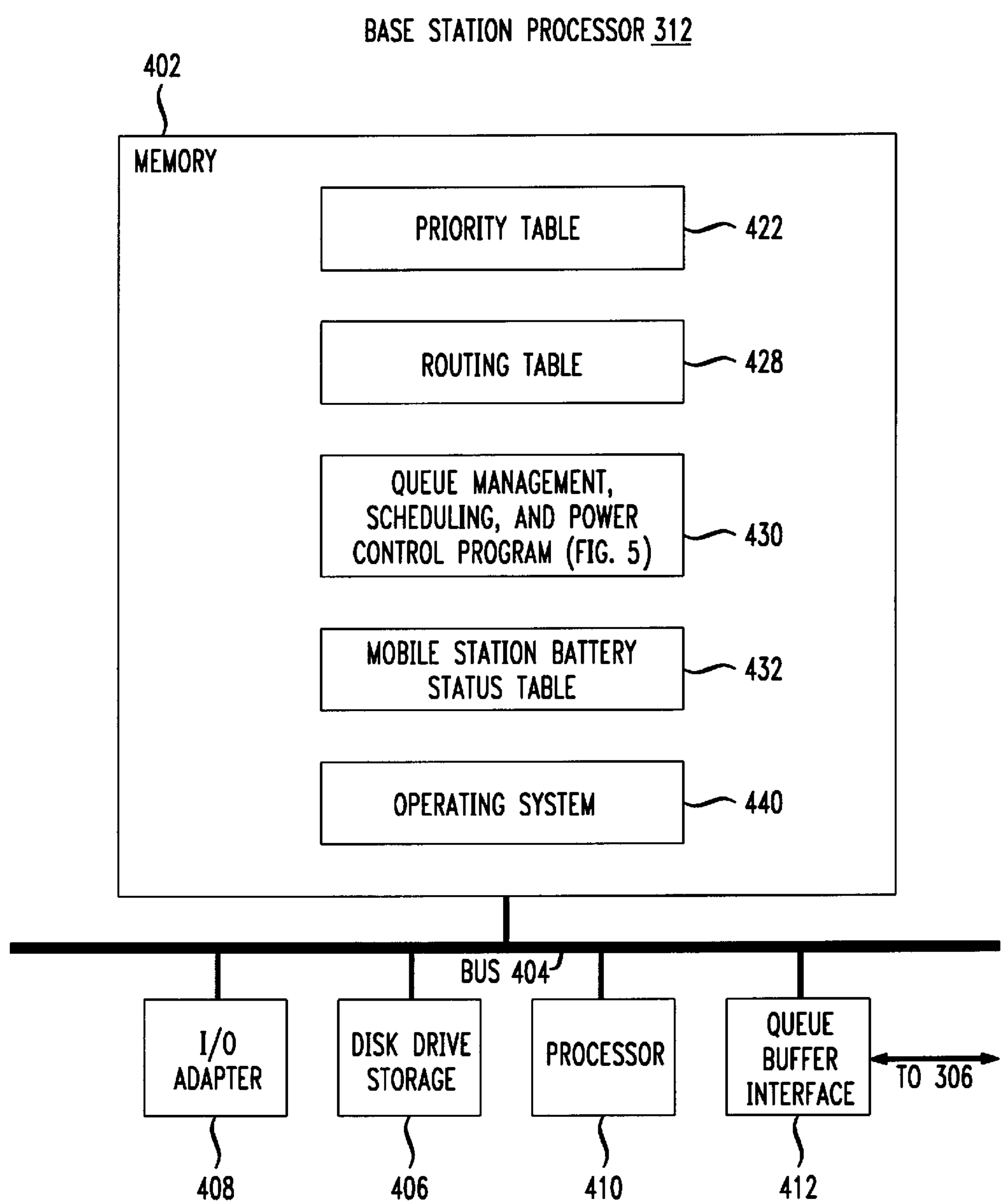
FIG. 4 is a more detailed architectural block diagram of the processor 312 in the base station B, in accordance with the invention.

FIG. 4 is a more detailed architectural block diagram of the processor 312 in the base station B, in accordance with the invention. Processor 312 includes the memory 402 connected by the bus 404 to the I/O adapter 408, the disk drive storage 406, the CPU processor 410 and the queue buffer interface 412. The queue buffer interface 412 is connected to the queue buffer 306. The memory 402 stores a priority table 422 that stores the priority values of the virtual circuit output queues for the mobile stations X and Y that are in active communication with the base station B. This is the queue status information that is included in the battery status message, identifying the priority level of each virtual circuit output queue The memory 402 stores a routing table 428 that routes messages between the mobile stations and the internet, the intranet LANs and WANs, and with the public switched telephone network (PSTN). The memory 402 stores the queue management, scheduling, and power control program 430, shown in greater detail in FIG. 5. The memory 402 stores the mobile station battery status table 432 which stores the measured residual power level of the battery reported by the battery status message for each of the mobile stations X and Y that are in active communication with the base station B. And, the memory 402 stores the operating system program 440. The CPU processor 410 processes the program instructions and data that are stored in the memory 402.

Figure 5:
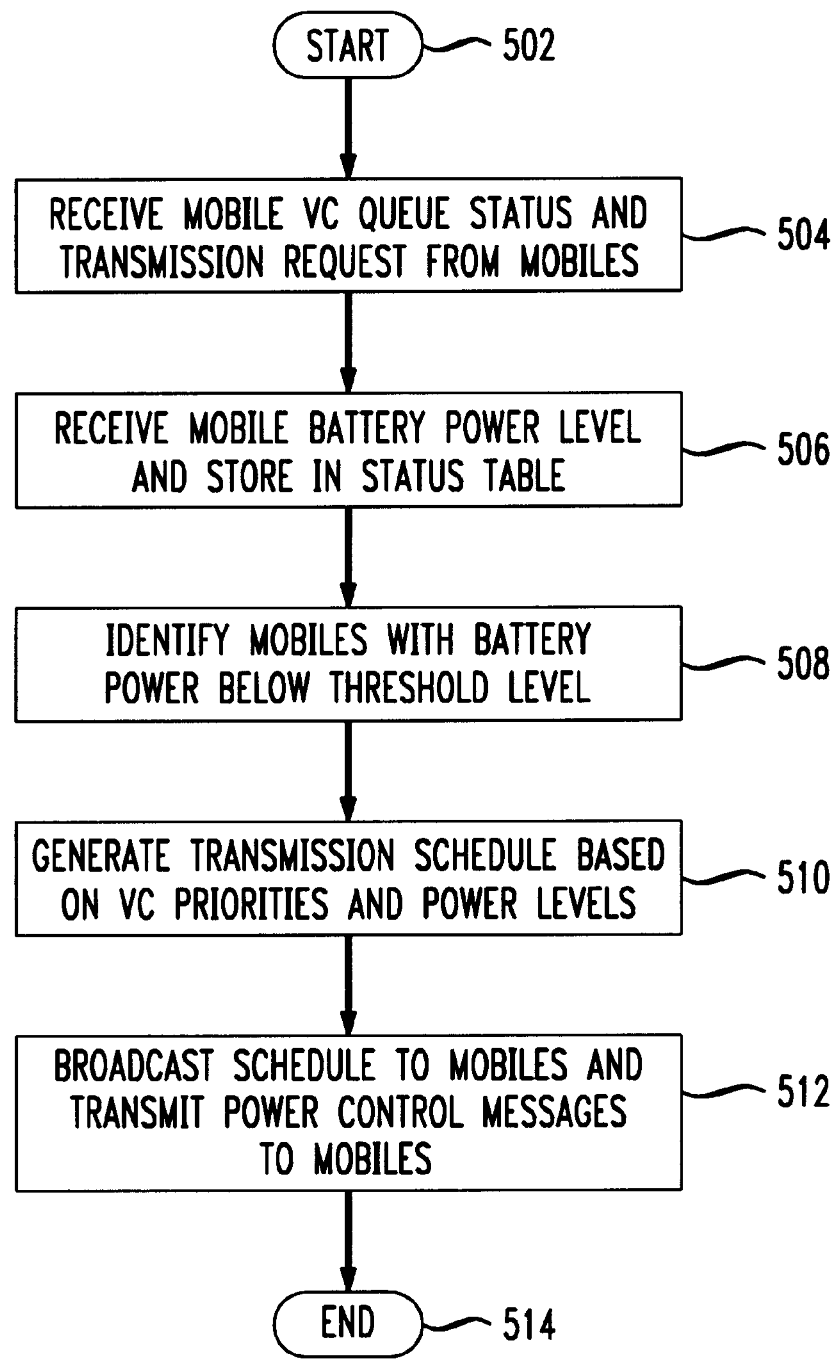
FIG. 5 is a flow diagram of the queue management, scheduling, and power control program 430 in the base station B, in accordance with the invention.

FIG. 5 is a flow diagram of the queue management, scheduling, and power control program 430 in the base station B, in accordance with the invention. The program starts at step 502 and proceeds to step 504, where the base station receives mobile VC queue status and transmission request messages from the mobile stations. The processor 312 stores virtual channel priority values from these messages into the priority table 422. Then, step 506 has the base station receiving the mobile stations' battery power levels in battery status messages. The battery power levels are stored by processor 312 in the mobile station battery status table 432. Then step 508 has the base station identify mobile stations that have a battery power level below a threshold value P-h. Then step 510 has the base station generate a new transmission schedule for the mobile stations that is based on the virtual channel priorities and the power levels of the mobile stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot. Then step 512 has the base station broadcast the new transmission schedule and power control messages to the mobile stations. Then step 514 ends the program.

Consider an infrastructure based wireless network. The network architecture consists of a basestation (BS) serving a region called the cell and a set of mobiles in this cell served by the basestation. The basestation has the responsibility of coordinating mobile access to the channels in the cell for communication.

In CDMA, many signals simultaneously occupy the same wide band of frequencies. A pseudonoise (PN) sequence or simply a CDMA code converts a narrowband message signal to a wideband noise-like signal before transmission. It is this code that effectively represents a CDMA channel. There are two main types of CDMA techniques: frequency hopped CDMA (FH-CDMA) and direct sequence CDMA (DS-CDMA).

FH-CDMA is a multiple access system in which the carrier frequencies of the individual mobiles are varied in a pseudorandom fashion within a wideband channel. The digital data to be transmitted is broken into uniform sized bursts. these bursts are then transmitted one at a time on one of these different carrier frequencies. So in FH-CDMA, the CDMA code and subsequently the CDMA generated PN code is used to synchronize the receiver's instantaneous frequencies with that of the transmitter.

In DS-CDMA systems, the CDMA code and thus the physical channel corresponds to a binary code. Each physical channel has its own pseudorandom binary code which is a sequence of binary symbols. To transmit one information bit, a DS-CDMA system transmits its entire code if the bit is a "one." For a "zero," it transmits the complement of its code. This process of transmitting a binary sequence in place of a bit in effect takes the narrowband message, i.e. the bit, and multiplies it by a very large bandwidth signal, i.e. the code. The receiver decodes the received signals using the same CDMA code to extract the message transmitted on that channel.

In both CDMA techniques, channels are provided by means of CDMA codes—either sequences of carrier frequencies or sequences of binary symbols. Of these multiple CDMA channels, some of the channels are used for downlink (BS to mobile) transmission, and the other channels are used for uplink (mobile to BS) transmission. For the hybrid CDMA/TDM system under consideration here, time will be divided into equal-length slots.

Figure 6:
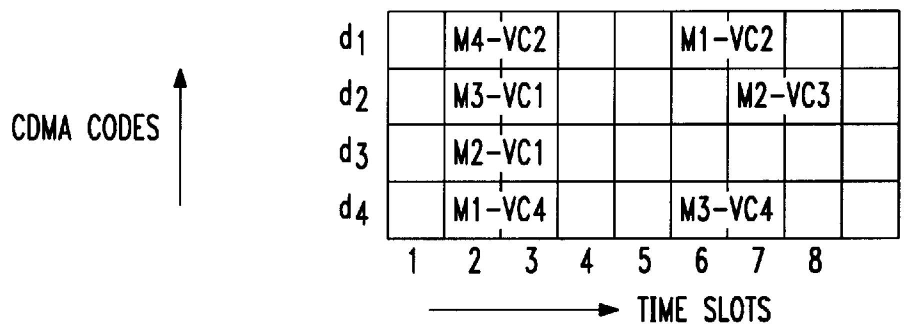
FIG. 6 shows a sample allocation of CDMA code/time slot combination to different mobile stations. Each allocation is for a specific virtual circuit associated with a mobile station.

Each uplink channel is allocated to one of the mobiles for a specified number of slots. During its assigned slot, the mobile must power up its transmitter—and using the predetermined CDMA code as channel—send out its digital stream which may be buffered. A two-dimensional array of CDMA codes and time slots is defined as shown in FIG. 6. Each CDMA code can be allocated to exactly one mobile in a time slot. Thus, multiple parallel communication channels are established within the cell using different pseudorandom codes.

A mobile has a transmitter and a receiver, each capable of receiving signals using a subset of, and possibly all, the available channels in the current cell. The mobile battery has a limited lifetime, and one of the main objectives of this invention is to conserve battery power usage in a two part process. First, medium access control (MAC) related activities, including data transmission and reception, are structured so as to realize and appropriately react to a mobile's battery power level and transmission queue. Second, as a natural consequence to this modification of the MAC activities, the power control algorithm inherent in CDMA systems can also altered be to adapt to mobiles' battery power levels.

Figure 7:
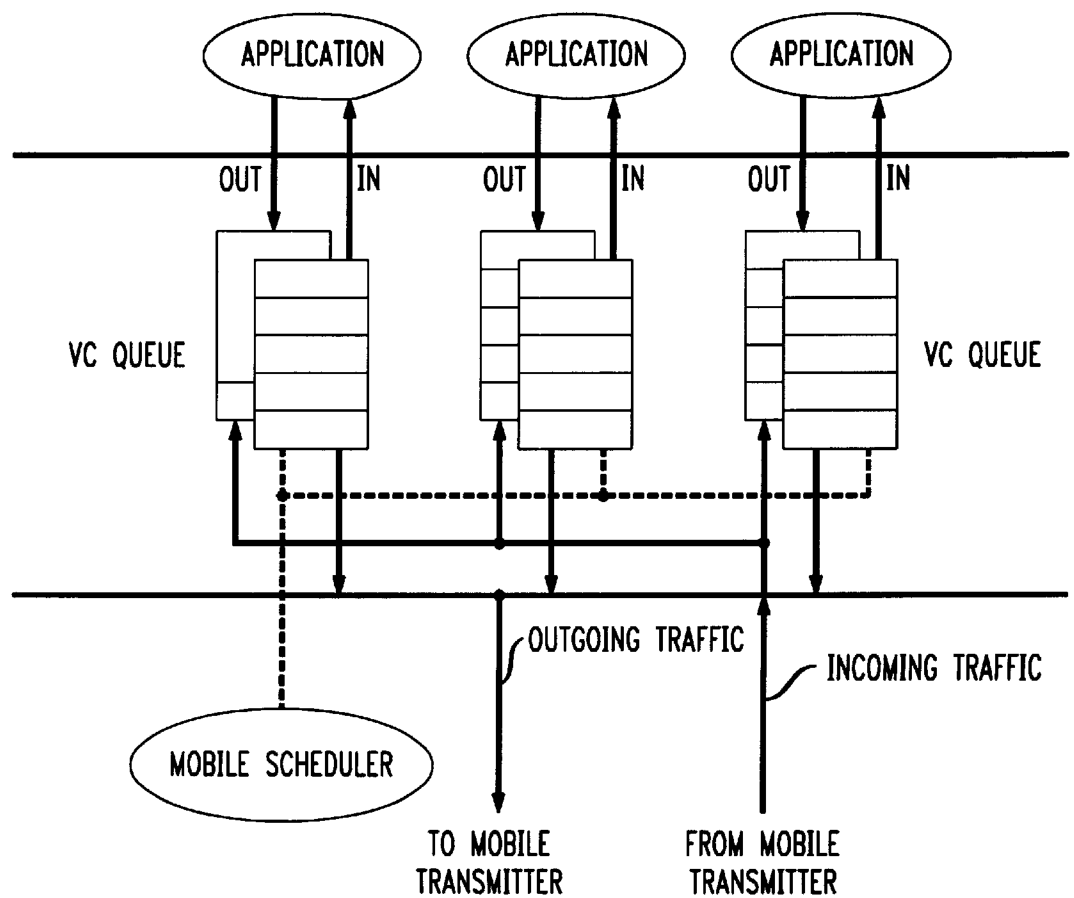
FIG. 7 shows a virtual circuit queue structure within a mobile station.

A mobile can originate and terminate multiple data connections, that enable it to communicate with other computers and communication devices. All communication to and from the mobile is through the basestation. Each such connection is referred to as a Virtual Circuit (VC). This technique is adopted in ATM (Asynchronous Transfer Mode) networking for multimedia communications. Each VC is associated with a transmission priority established by the mobile application utilizing this VC for communication. These priorities will be utilized by the basestation when allocating channels to the mobiles. Each mobile maintains a separate queue for each of its VC, as shown in FIG. 7.

Periodically, each active mobile in the current cell transmits the current queue status of all its VC queues. The basestation executes a scheduling algorithm which generates an allocation of channels and time slots to the mobiles. The order of this allocation is calculated based on the priorities associated with the different VCs. Specifically, the BS assigns a code-time slot combination to a mobile's VC. The allocation information is then broadcast to all the mobiles which transmit according to this schedule.

Figure 8:
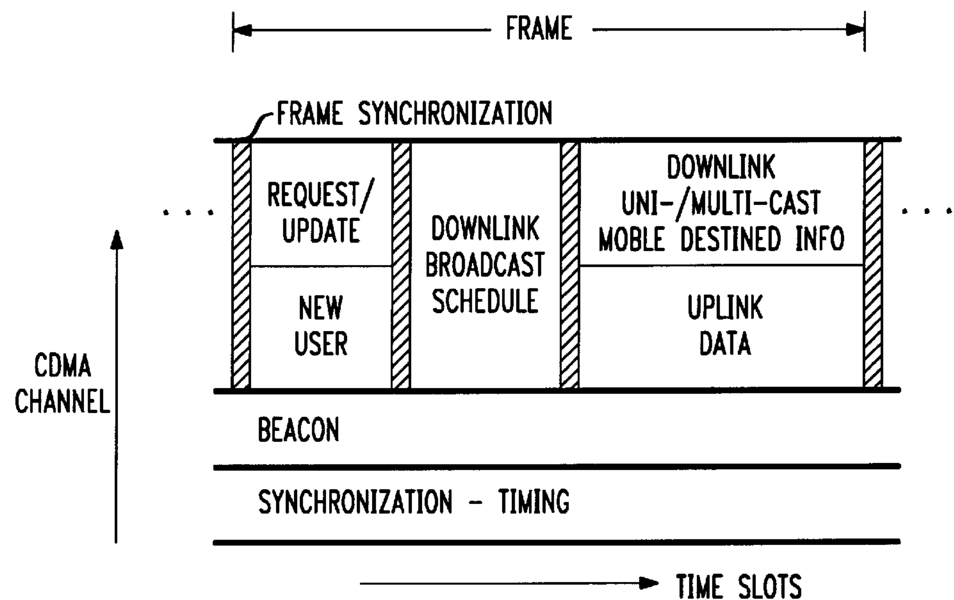
FIG. 8 shows a frame structure of the CDMA multiple access protocol showing the various sub-phases.
Figure 9:
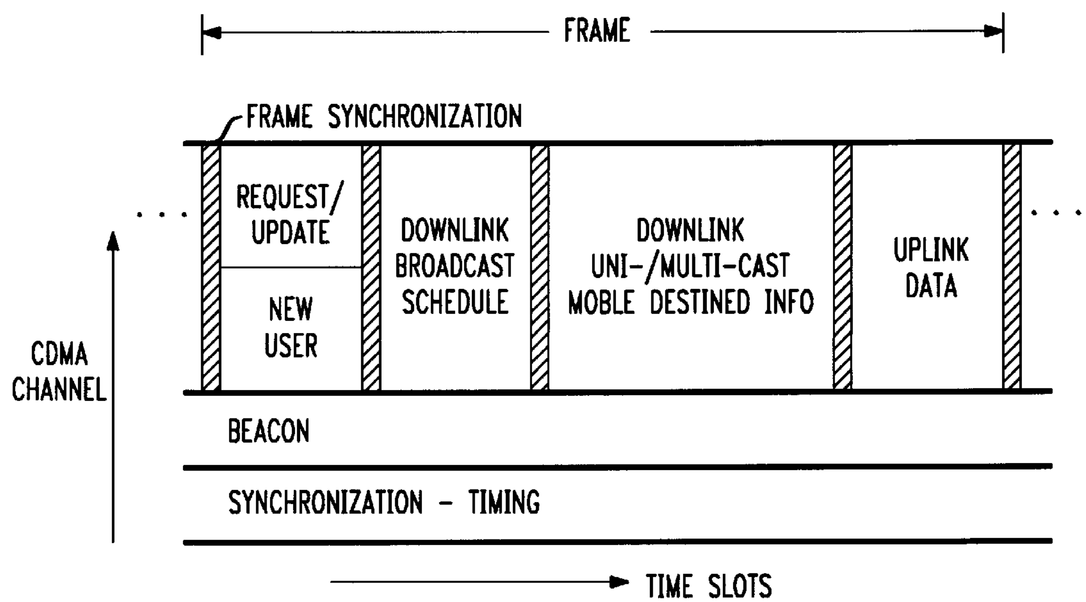
FIG. 9 shows a frame structure for a network using CDMA and time slots along each CDMA channel. This structure allows all CDMA codes to be used in the down-link unicast/multicast mode, and in the up-link data mode. This situation might arise if the mobile transceiver cannot transmit and receive simultaneously.

Transmission in the network is divided into frames. Each frame may consist of a number of subframes, say three, four, or five. FIG. 8 shows a frame with three subframes. At the beginning of each frame, there is a frame synchronization phase that aids new and current users to establish and maintain synchronization. In the request/update and new user phase, mobiles use two distinct, known sets of uplink channels. Using the request/update set of channels, registered mobiles transmit their current queue status, battery power level, and other information on the uplink channels to the basestation. During this same time, new mobiles entering the system register at the basestation using new-user set of channels. Next comes the downlink broadcast phase, when the basestation broadcasts on the downlink, data, acknowledgements and scheduling information that all mobiles need to receive. In CDMA, this downlink data also includes power control information for the mobile, indicating if the basestation is receiving the transmitted signal at a sufficient power level or not. This is followed by downlink unicast/multicast and uplink phase when another two distinct set of channels are used. During this phase a group of downlink channels. Since CDMA mobiles are capable of receiving and transmitting simultaneously, during this phase mobiles can also transmit data on the uplink using their assigned CDMA codes and time slots. Outside of these information channels, there are two additional downlink channels: beacon and synchronization and timing. On these channels, the basestation continuously transmits overhead information. On the beacon, the basestation informs mobiles what channels to use for the request/update phase and for the new user phase. It carries additional information concerning phasing and transmit signal power levels. The synchronization-timing channel provides system timing information. FIGS. 9, 10, 11 and 12 show other frame structures that are applicable to this invention.

The first part of this invention proposes the following method: In addition to the queue status information, the mobile transmits the current battery power level to the basestation. Four power status levels are defined which correspond to fill, half-full, low and nearly-empty. The BS is thus aware of the queue status, the queue priority, and the mobile's battery power level. Using this, it dynamically readjusts the allocation of CDMA code-slot allocations such that a mobile with lower batter power level transmits ahead of a mobile with more power. This will enable the low-power mobile to transmit crucial information before a possible shutdown.

For example, consider the situation where there are three mobiles currently in the cell. MH-1 indicates that its battery power level is full, MH-2, indicates low, and MH-3 indicates nearly empty. The BS computes the schedule such that MH-3 is given permission to transmit data from all its high-priority queues, S followed by MH-2 to transmit data from its high-priority queues, and MH-1 transmits its high-priority data last. The BS then allocates for low-priority queues from MH-1, MH-2, and MH-3 to be transmitted. The implication of this prioritizing is that low-priority, high-power mobiles are given the lowest priority. This mechanism thus utilizes global power level information regarding all the mobiles in its cell.

A natural consequence of prioritizing at the basestation based on both the battery power-level and call priority is that high priority calls from "nearly-empty" mobiles will be scheduled first and thus simultaneously on different channels. Scheduled next are high priority calls from "low" mobiles followed by high priority cells from "half-full" mobiles and finally high priority calls from "full" mobiles. The scheduling algorithm then allocates slots for low-priority calls. There are two alternative schemes for handling low-priority traffic. The first could be gaining higher priority to "full" mobiles and next "half-full" and then "low" and finally "nearly-empty" mobiles. The other option is then the reverse, i.e. giving high priority to "nearly-empty" mobiles, then "low," followed by "half-full," and finally "full."

Mobiles operating in CDMA transmit under strict power control. One of the implications of spreading a message signal over a wideband is that each transmitted signal must be received by the basestation at similar power levels. Thus mobiles that are located farther away from the basestation must transmit their signals at a much higher power level than mobiles positioned near a basestation so that both signals may be received at the basestation at equivalent power levels. Called the near far problem, this scenario is unique to CDMA. As a response to this issue, CDMA uses a power control algorithm consisting of open-loop and closed-loop power control at the mobile.

In open-loop power control, each mobile measures the signal power level of the downlink message it receive from the basestation. Based on this measurement and a prescribed target, the mobile then computes how much to adjust its own transmission to achieve the desired target power signal or message level.

For closed-loop power control, the basestation receives each mobile's signal and measures its power level. Again the basestation periodically multiplexes power control message in the downlink data directed to all the mobiles. This message indicates to the mobile if it should increase or decrease its transmitted power so as to maintain the desired power levels at the CDMA basestation. The amount of power increase or decrease is prescribed by the system. For example, a basestation may multipex a one bit power control message every 1.25 ms where a bit "one" indicates that the mobile should increase its power by 1 db and a "zero" indicates it should decrease its power by 1 db. In such a scenario, the mobile has to either increase or decease its transmitted power. If the power control message is increased then the basestation can request more power level changes, including the option not to change the transmitted signal power level.

The final power adjustment performed at the mobile depends on a combination of these open and closed-loop power control algorithms. The mobile computes how much it has to increase or decrease its power level based on the pen-loop measurement and then listens to the basestation to determine the closed-loop adjustment. The mobile then adds the two open and closed-loop adjustments to finally compute its amplification factor.

Now due to the prioritizing scheme, the base station knows exactly which of the mobiles are at a low batter power levels. In fact, the basestation also realizes that the lower-power, high-priority mobiles' transmission will be clustered in time. So during the uplink phase, the basestation breaks down the time interval into four different clusters: lower-power and high priority, higher-power and high priority, lower-power and low priority and finally, higher-power and low priority. The power control at the basestation is modified in time to account for the lower-power time segments. In other words, if the basestation knows that transmissions from lower-power mobiles constitute a particular segment of the uplink data phase, then it can lessen its power control requirements during that segment of time. Then, the basestation will effectively modify its demands on both the open loop and closed-loop power control so as to conserve battery in a lower-power, high-priority mobile.

In the case of a lower-power mobile that is currently transmitting at a power level higher than the desired target, the basestation can proceed as before and periodically multiplex a power control message that requests a transmitted power decrease. In fact the periodicity of a power decrease message geared towards these "low" and "nearly-empty" battery mobiles could be dynamically adjusted to occur twice in every frame, once during the downlink broadcast phase and one during the downlink unicast/multicast phase. (see FIG. 8)

If on the other hand, the mobile is currently transmitting at a power level lower than the targeted power, then two possible battery-conserving steps can be taken by the power control algorithm. First if the mobile under consideration has been marked as "low", then the basestation can make transmission power increase requests of the mobile if the power level falls below some bare-minimum threshold These requests will however occur with a larger periodicity. For "nearly-empty" mobiles, the basestation can backoff from any power increase requests, realizing the poor battery status of these mobiles. So in effect, the basestation avoids asking any lower-power mobile to expend its remaining power to meet a higher closedloop power control requirement. In this situation, the basestation relies on the dynamic nature of the radio channel as well as the robustness of CDMA error-correcting codes to correctly receive the transmitted signal.

A second alternative adjustment to the power control algorithm is described here. During times when the basestation receives signals from lower-power mobiles, it fixes its power control scheme to ask for power decrease in larger possible decrements so that fewer power decrease control messages have to be sent to the mobile before the mobile can achieve a lower target power level. Similarly, for "low" battery mobiles, the power control algorithm could ask for power increases in smaller increments so as to achieve the bare-minimum power level while expending the least amount of power possible.

There is an additional method that the mobile can follow to better utilize remaining battery power. This is based on the observation that there is always a finite time between transmission of a mobile's battery power level, and the BS responding to this information. Note that this delay is to allow the BS to gather status information from other mobiles, and to compute the transmission schedule, as shown in FIG. 6.

During this time, the mobile's queue status may have changed. For example, a high-priority queue which was empty earlier may have had new data packets added. The schedule computed by the BS is based on the status that was sent by the mobile earlier during the request update phase. If the power level is below a certain threshold, the mobile recalculates the internal priorities of its own queues, and transmits time-crucial information first. This method minimizes the adverse effect due to queue status changes before the BS dynamically updates its priorities.

Figure 10:
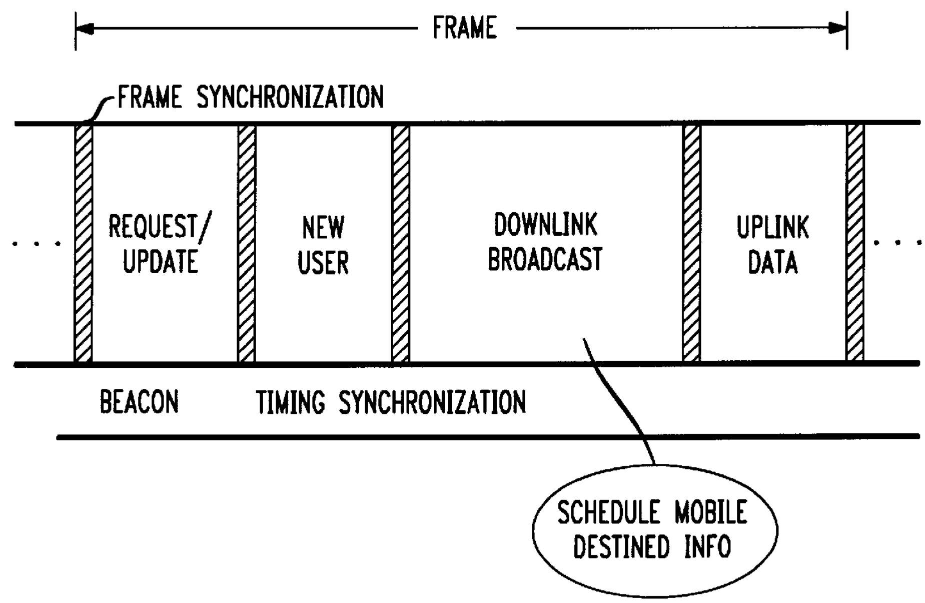
FIG. 10 shows a frame structure for a network using CDMA and time slots along each CDMA code, with two CDMA codes available. One channel is reserved for beacon and timing synchronization. The other is used in a time division duplexing (TDD) mode, for information transfer.

For example, consider the situation where a mobile has two queues, one for voice, and the other for a file transfer protocol (ftp) connection. The voice queue has higher priority than data because of voice traffic's delay constraints. Assume that when the mobile transmitted the queue status, the voice queue was empty but the ftp queue was non-empty. Therefore, the BS would have allocated slots in the next uplink data phase only for the ftp queue. In the meantime, data has been added to the voice queue which may have to be transmitted sooner under low-power conditions. The modification that we propose will let the mobile transmit the voice data in the slots allocated to the ftp queue, if the mobile detects low battery power. The mobile scheduler shown in FIG. 7, will utilize the power level information to decide which of the mobile's queues will be transmitted. FIG. 10. Frame structure for network using CDMA and time slots along each CDMA code, with two COMA codes available. One channel is reserved for beacon and timing synchronization. The other is used in a Time Division Duplexing (TDD) mode, for information transfer.

Figure 11:
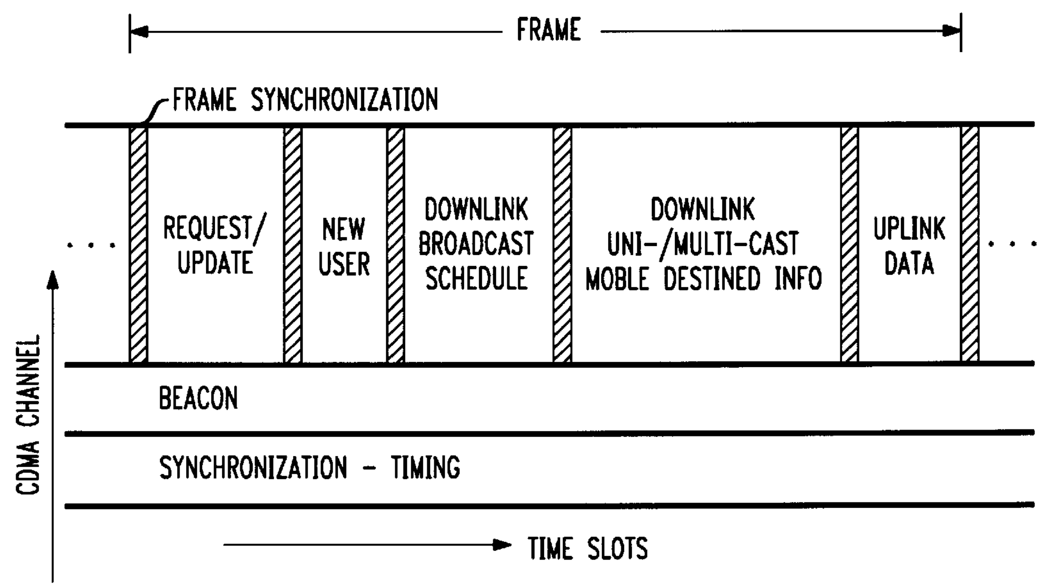
FIG. 11 shows a frame structure for a network using CDMA and time slots along each CDMA code, with more than three CDMA codes available. This structure allows all information CDMA codes to be used in the down-link unicast/multicast mode, and in the up-link data mode. This situation may arise if the mobile transceiver cannot transmit and receive simultaneously.

FIG. 11. Frame structure for network using CDMA and time slots along each CDMA code, for more than three CDMA codes. This structure allows all information CDMA codes to be used in the downlink unicast/multicast mode, and in the uplink data mode. This situation may arise if the mobile transceiver cannot transmit AND receive simultaneously.

Figure 12:
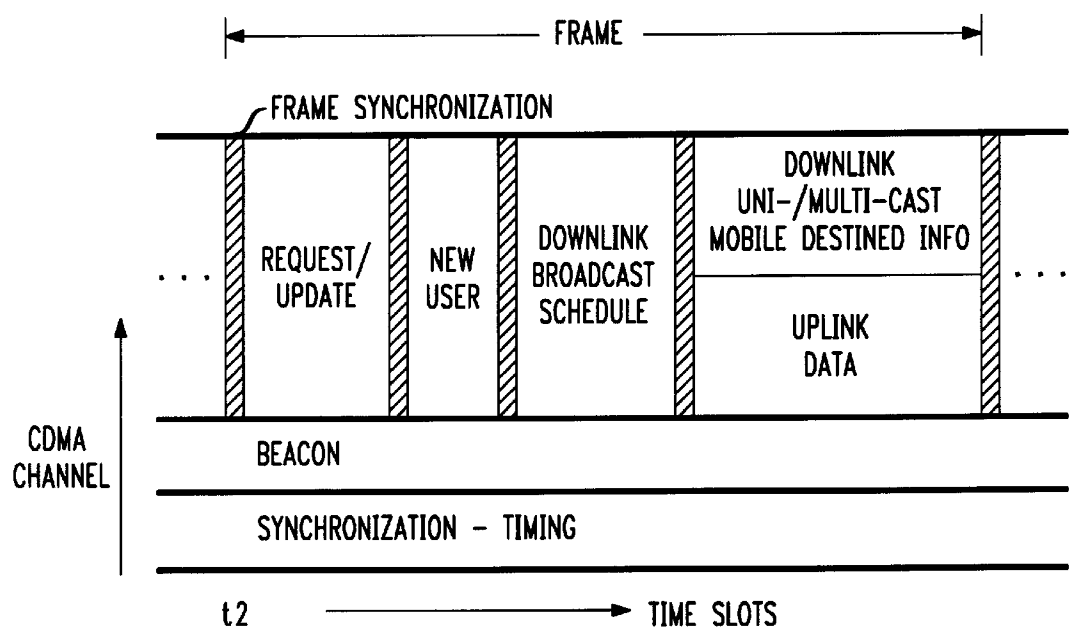
FIG. 12 shows a frame structure for a network using CDMA and time slots along each CDMA channel, for more than three channels. The request/update and new-user phases are separated in time.

FIG. 12. Frame structure for network using CDMA and time slots along each CDMA channel, for more than three channels. The request/update and new-user phases are separated in time.

In accordance with the invention, scheduling priorities in a wireless communications system are adapted to conserve battery power in mobile terminals operating within the system. In a preferred embodiment, a base station, within the system, receives battery power level information and other setup information from mobile terminals operating within the service area of the base station during call setup procedures. Based on the battery power level information and other setup information, the base station adapts scheduling priorities for the mobile terminals to expedite wireless transmissions from those mobile terminals reporting low battery power levels. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

The inventive method begins by receiving at the base station a signal from a mobile station that its battery power is below a threshold value. In response to this, the base station changes a mobile transmission schedule to cause transmission of messages from the mobile station to occur before transmission of messages from other stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot. The base station then transmits the schedule to the mobile stations. By advancing the scheduled transmission of messages from a mobile station whose battery power is low, those messages have a higher probability of successful transmission before the battery power level diminishes further.

In a further aspect of the invention, the mobile station can have a high priority message and a low priority message to transmit. In accordance with the invention, the base station changes the mobile transmission schedule to cause transmission of the high priority message to occur before transmission of high priority messages from other stations and to cause transmission of the low priority message to occur before transmission of low priority messages from other stations, but not before the transmission of high priority messages from other stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

In still a further aspect of the invention, a first mobile station can have a first high priority message and a first low priority message to transmit and can have its battery power below a first threshold value. The base station can also receive a signal from a second mobile station that its battery power is below a second threshold value greater than the first threshold value. The second mobile station can have a second high priority message and a second low priority message to transmit. In accordance with the invention, the base station changes the mobile transmission schedule to cause transmission of the messages to be ordered with the first high priority, followed by the second high priority, followed by high priority messages from other stations, followed by the first low priority, followed by the second low priority, followed by low priority messages from other stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

In yet a further aspect of the invention, the inventive method defines at least a portion of a code division multiple access frame with a first time slot for the messages from the low power mobile station to occur before a second time slot for the messages from the other stations. The mobile station can have a high priority message and a low priority message to transmit. In accordance with the invention, the base station changes the mobile transmission schedule to define at least a portion of a code division multiple access frame with a first time slot for the high priority message to occur before a second time slot for high priority messages from other stations, and with a third time slot for the low priority message to occur before a fourth time slot for low priority messages from other stations, but not before the second time slot for high priority messages from other stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

In still a further aspect of the invention, the first mobile station can have a first high priority message and a first low priority message to transmit and it can have its battery power below a first threshold value. The base station can receive a signal from a second mobile station that its battery power is below a second threshold value greater than the first threshold value. The second mobile station can have a second high priority message and a second low priority message to transmit. In accordance with the invention, the base station changes the mobile transmission schedule to define at least a portion of a code division multiple access frame with a first time slot for the first high priority message, followed by a second time slot for the second high priority message, followed by a third time slot for the high priority messages from other stations, followed by a fourth time slot for the first low priority message, followed by a fifth time slot for the second low priority message, followed by a sixth time slot for the low priority messages from other stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

In still a further aspect of the invention, the base station defines an up-link data sub-frame portion of a code division multiple access frame with a first time slot for the messages from the low battery power mobile station to occur before a second time slot for the messages from the other stations. The base station further defines a down-link subframe portion of the code division multiple access frame for messages from the base station to the mobile stations. The base station can selectively order the down-link subframe portion to occur either before or after the up-link data sub-frame portion. The base station further defines a down-link broadcast subframe portion of the code division multiple access frame for transmitting the schedule to the mobile stations. The base station further defines an up-link status sub-frame portion of the code division multiple access frame for the signal from the mobile station reporting its battery power status. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

In still a further aspect of the invention, the mobile station has a high priority message queue and a low priority message queue. In accordance with the invention, the base station changes the mobile transmission schedule to cause transmission of high priority messages from the high priority message queue to occur before transmission of high priority messages from other stations and to cause transmission of low priority messages from the low priority message queue to occur before transmission of low priority messages from other stations, but not before the transmission of high priority messages from other stations. Further in accordance with the invention, the base station defines an up-link data sub-frame portion of a code division multiple access frame with a first time slot for the messages from the first mobile station to occur before a second time slot for the messages from the other stations, a down-link subframe portion of the code division multiple access frame for messages from the base station to the first and other stations, a down-link broadcast subframe portion of the code division multiple access frame for transmitting the schedule to the first and other stations, and an up-link status sub-frame portion of the code division multiple access frame for the signal from the first mobile station reporting its battery power status and its message queue status. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

In this manner, the invention takes a more active, direct role in managing mobile terminals operating with low battery power levels.

The network coverage area is divided into cells, and each cell is served by a base station B. The mobile station communicates with the rest of the network through the base station. In the case of a radio frequency network, there will be one or more radio frequencies or channels in a cell, available for communication. The base station will dynamically allocate permission to the mobile stations to transmit on the channels. Each mobile station maintains its set of queues to hold data to be transmitted. When a mobile is given permission to transmit on a channel, it selects information from the appropriate queue, and transmits data from that queue.

Information is organized into fixed-size packets or slots. The mobile maintains one queue for each Virtual Circuit connection, and each queue is associated with a priority. Every mobile station in the cell coverage area of the base station informs the base station of the current status of all its virtual circuit queues. The base station schedules packets for transmission from the various queues based on the status of the queues and the queue priorities. The invention adaptively varies the priorities of the connections based on the battery power level of the mobile station. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

The mobile station radio operates in three modes: transmit, active receive and sleep. Typically, maximum power is consumed during transmit mode, and least power is consumed during sleep or standby mode. It is essential to optimize the time spent during transmit and receive modes to achieve packet transmission and reception.

In addition to status about the queue, the mobile station also transmits its battery power level. In the examples given herein, four discrete power levels are transmitted to the base station: full, half-full, low, nearly-empty. The base station makes the slot allocations using the queue status and priority information, and the battery power information. This ensures that mobiles with lower battery power are allowed to transmit ahead of other mobiles. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

The scheduling algorithm for up-link traffic overlays the priorities created due to battery-level over the packet priorities as captured in the queue status information. Thus the transmission queues are ordered by a new priority which is derived by the two component priorities. Thus, mobile station X with lower battery power level will be permitted to transmit packets with a higher priority than another mobile station Y with a safe battery level transmitting packets with identical cell priority as X. For datagram packets with no notion of priorities, the base station will determine the schedules based entirely on the battery power levels of the transmitting mobile stations. The base station schedules the transmissions from low battery power mobile stations to be clustered together in a low-power time slot which is separate in time from the scheduled transmissions from high battery power mobile stations. The base station transmits a power control message to the low battery power mobile stations, to reduce the transmission power required for those mobile stations during the low-power time slot.

The invention provides an efficient, transparent, and low-cost methodology for enhancing the performance of mobile terminals using the CDMA protocol. Instead of using sleep mode algorithms which cause significant delay due to the required longer buffering at the base station, the invention provides an optimum methodology which actively responds to real-time mobile terminal battery power levels to ensure an acceptable quality-of-service. Therefore, the invention, by using a more direct approach, enables the low-power mobile terminal to continue transmitting high priority messages to the wireless base station.

Although the invention has been described using four specific battery power levels, it is not deemed a departure from the scope of the appended claims for other named or other numbered battery power levels to be used.

Various illustrative examples of the invention have been described in detail. In addition, however, many modifications and changes can be made to these examples without departing from the nature and spirit of the invention.

What is claimed is:

1. A method to manage mobile stations in a wireless network, comprising:

receiving at a base station a low battery power signal from a first mobile station that its battery power is below a threshold value;

changing at the base station a mobile transmission schedule to cause transmission of messages from the first mobile station to occur before transmission of messages from other stations, in response to the low battery power signal;

scheduling transmissions from low battery power mobile stations to be clustered together in a low-power time slot which is separate in time from scheduled transmissions from high battery power mobile stations in response to the low battery power signal;

transmitting a power control message to the low battery power mobile stations, to reduce the transmission power required for the low battery power mobile stations during the low-power time slot in response to the low battery power signal; and transmitting the schedule to the first and other stations in response to the low battery power signal.

2. The method of claim 1, which further comprises:

said first mobile station having a high priority message and a low priority message to transmit;

said changing step causing transmission of said high priority message to occur before transmission of high priority messages from other stations;

said changing step causing transmission of said low priority message to occur before transmission of low priority messages from other stations, but not before the transmission of high priority messages from other stations.

3. The method of claim 1, which further comprises:

said changing step defining at least a portion of a code division multiple access frame with a first time slot for the messages from the first mobile station to occur before a second time slot for the messages from the other stations.

4. The method of claim 1, which further comprises:

said first mobile station having a high priority message and a low priority message to transmit;

said changing step defining at least a portion of a code division multiple access frame with a first time slot for said high priority message to occur before a second time slot for high priority messages from other stations, and with a third time slot for said low priority message to occur before a fourth time slot for low priority messages from other stations, but not before the second time slot for high priority messages from other stations.

5. The method of claim 1, which further comprises:

said changing step defining an up-link data sub-frame portion of a code division multiple access frame with a first time slot for the messages from the first mobile station to occur before a second time slot for the messages from the other stations;

defining a down-link subframe portion of the code division multiple access frame for messages from the base station to the first and other stations; ordering said down-link subframe portion to occur before said up-link data sub-frame portion.

6. The method of claim 1, which further comprises:

said changing step defining an up-link data sub-frame portion of a code division multiple access frame with a first time slot for the messages from the first mobile station to occur before a second time slot for the messages from the other stations;

defining a down-link subframe portion of the code division multiple access frame for messages from the base station to the first and other stations;

ordering said down-link subframe portion to occur after said up-link data sub-frame portion.

7. The method of claim 1, which further comprises:

said changing step defining an up-link data sub-frame portion of a code division multiple access frame with a first time slot for the messages from the first mobile station to occur before a second time slot for the messages from the other stations;

defining a down-link subframe portion of the code division multiple access frame for messages from the base station to the first and other stations; and defining a down-link broadcast subframe portion of the code division multiple access frame for transmitting the schedule to the first and other stations.

8. The method of claim 1, which further comprises:

said changing step defining an up-link data sub-frame portion of a code division multiple access frame with a first time slot for the messages from the first mobile station to occur before a second time slot for the messages from the other stations;

defining a down-link subframe portion of the code division multiple access frame for messages from the base station to the first and other stations;

defining a down-link broadcast subframe portion of the code division multiple access frame for transmitting the schedule to the first and other stations; and defining an up-link status sub-frame portion of the code division multiple access frame for the signal from the first mobile station reporting its battery power status.

9. The method of claim 1, which further comprises:

said first mobile station having a high priority message queue and a low priority message queue;

said changing step causing transmission of high priority messages from said high priority message queue to occur before transmission of high priority messages from other stations;

said changing step causing transmission of low priority messages from said low priority message queue to occur before transmission of low priority messages from other stations, but not before the transmission of high priority messages from other stations.

10. The method of claim 1, which further comprises:

said first mobile station having a high priority message queue and a low priority message queue;

said changing step causing transmission of high priority messages from said high priority message queue to occur before transmission of high priority messages from other stations;

said changing step causing transmission of low priority messages from said low priority message queue to occur before transmission of low priority messages from other stations, but not before the transmission of high priority messages from other stations;

said changing step defining an up-link data sub-frame portion of a code division multiple access frame with a first time slot for the messages from the first mobile station to occur before a second time slot for the messages from the other stations;

defining a down-link subframe portion of the code division multiple access frame for messages from the base station to the first and other stations;

defining a down-link broadcast subframe portion of the code division multiple access frame for transmitting the schedule to the first and other stations; and defining an up-link status sub-frame portion of the code division multiple access frame for the signal from the first mobile station reporting its battery power status and its message queue status.

11. A method to manage mobile stations in a wireless network, comprising:

receiving at a base station a signal from a first mobile station that its battery power is below a threshold value;

changing at the base station a mobile transmission schedule to cause transmission of messages from the first mobile station to occur before transmission of messages from other stations, in response to the signal;

scheduling transmissions from low battery power mobile stations to be clustered together in a low-power time slot which is separate in time from scheduled transmissions from high battery power mobile stations;

transmitting a power control message to the low battery power mobile stations, to reduce the transmission power required for the low battery power mobile stations during the low-power time slot;

transmitting the schedule to the first and other stations;

said first mobile station having a first high priority message and a first low priority message to transmit and having its battery power below a first threshold value;

receiving at a base station a signal from a second mobile station that its battery power is below a second threshold value greater than the first threshold value;

said second mobile station having a second high priority message and a second low priority message to transmit;

said changing step causing transmission of said messages to be ordered with the first high priority, followed by the second high priority, followed by high priority messages from other stations, followed by the first low priority, followed by the second low priority, followed by low priority messages from other stations.

12. A method to manage mobile stations in a wireless network, comprising:

receiving at a base station a signal from a first mobile station that its battery power is below a threshold value;

changing at the base station a mobile transmission schedule to cause transmission of messages from the first mobile station to occur before transmission of messages from other stations, in response to the signal;

scheduling transmissions from low battery power mobile stations to be clustered together in a low-power time slot which is separate in time from scheduled transmissions from high battery power mobile stations;

transmitting a power control message to the low battery power mobile stations, to reduce the transmission power required for the low battery power mobile stations during the low-power time slot;

transmitting the schedule to the first and other stations;

said first mobile station having a first high priority message and a first low priority message to transmit and having its battery power below a first threshold value;

receiving at a base station a signal from a second mobile station that its battery power is below a second threshold value greater than the first threshold value;

said second mobile station having a second high priority message and a second low priority message to transmit;

said changing step defining at least a portion of a code division multiple access frame with a first time slot for the first high priority message, followed by a second time slot for the second high priority message, followed by a third time slot for the high priority messages from other stations, followed by a fourth time slot for the first low priority message, followed by a fifth time slot for the second low priority message, followed by a sixth time slot for the low priority messages from other stations.

13. A system to manage mobile stations in a wireless network, comprising:

means for receiving at a base station a low battery power signal from a first mobile station that its battery power is below a threshold value;

means for changing at the base station a mobile transmission schedule to cause transmission of messages from the first mobile station to occur before transmission of messages from other stations, in response to the low battery power signal;

means for scheduling transmissions from low battery power mobile stations to be clustered together in a low-power time slot which is separate in time from scheduled transmissions from high battery power mobile stations in response to the low battery power signal;

means for transmitting a power control message to the low battery power mobile stations, to reduce the transmission power required for the low battery power mobile stations during the low-power time slot in response to the low battery power signal; and means for transmitting from the base station the schedule to the first and other stations in response to the low battery power signal.

14. The system of claim 13, which further comprises:

said first mobile station having a high priority message and a low priority message to transmit;

said changing means causing transmission of said high priority message to occur before transmission of high priority messages from other stations;

said changing means causing transmission of said low priority message to occur before transmission of low priority messages from other stations, but not before the transmission of high priority messages from other stations.

15. The system of claim 13, which further comprises:

said changing means defining at least a portion of a code division multiple access frame with a first time slot for the messages from the first mobile station to occur before a second time slot for the messages from the other stations.

16. The system of claim 13, which further comprises:

said first mobile station having a high priority message and a low priority message to transmit;

said changing means defining at least a portion of a code division multiple access frame with a first time slot for said high priority message to occur before a second time slot for high priority messages from other stations, and with a third time slot for said low priority message to occur before a fourth time slot for low priority messages from other stations, but not before the second time slot for high priority messages from other stations.

17. The system of claim 13, which further comprises:

said changing means defining an up-link data sub-frame portion of a code division multiple access frame with a first time slot for the messages from the first mobile station to occur before a second time slot for the messages from the other stations;

means for defining a down-link subframe portion of the code division multiple access frame for messages from the base station to the first and other stations;

means for ordering said down-link subframe portion to occur before said up-link data sub-frame portion.

18. The system of claim 13, which further comprises:

said changing means defining an up-link data sub-frame portion of a code division multiple access frame with a first time slot for the messages from the first mobile station to occur before a second time slot for the messages from the other stations;

means for defining a down-link subframe portion of the code division multiple access frame for messages from the base station to the first and other stations;

means for ordering said down-link subframe portion to occur after said up-link data sub-frame portion.

19. The system of claim 13, which further comprises:

said changing means defining an up-link data sub-frame portion of a code division multiple access frame with a first time slot for the messages from the first mobile station to occur before a second time slot for the messages from the other stations;

means for defining a down-link subframe portion of the code division multiple access frame for messages from the base station to the first and other stations; and means for defining a down-link broadcast subframe portion of the code division multiple access frame for transmitting the schedule to the first and other stations.

20. The system of claim 13, which further comprises:

said changing means defining an up-link data sub-frame portion of a code division multiple access frame with a first time slot for the messages from the first mobile station to occur before a second time slot for the messages from the other stations;

means for defining a down-link subframe portion of the code division multiple access frame for messages from the base station to the first and other stations;

means for defining a down-link broadcast subframe portion of the code division multiple access frame for transmitting the schedule to the first and other stations; and means for defining an up-link status sub-frame portion of the code division multiple access frame for the signal from the first mobile station reporting its battery power status.

21. The system of claim 13, which further comprises:

said first mobile station having a high priority message queue and a low priority message queue;

said changing means causing transmission of high priority messages from said high priority message queue to occur before transmission of high priority messages from other stations;

said changing means causing transmission of low priority messages from said low priority message queue to occur before transmission of low priority messages from other stations, but not before the transmission of high priority messages from other stations.

22. The system of claim 13, which further comprises:

said first mobile station having a high priority message queue and a low priority message queue;

said changing means causing transmission of high priority messages from said high priority message queue to occur before transmission of high priority messages from other stations;

said changing means causing transmission of low priority messages from said low priority message queue to occur before transmission of low priority messages from other stations, but not before the transmission of high priority messages from other stations;

said changing means defining an up-link data sub-frame portion of a code division multiple access frame with a first time slot for the messages from the first mobile station to occur before a second time slot for the messages from the other stations;

means for defining a down-link subframe portion of the code division multiple access frame for messages from the base station to the first and other stations;

means for defining a down-link broadcast subframe portion of the code division multiple access frame for transmitting the schedule to the first and other stations; and means for defining an up-link status sub-frame portion of the code division multiple access frame for the signal from the first mobile station reporting its battery power status and its message queue status.

23. A system to manage mobile stations in a wireless network, comprising:

means for receiving at a base station a signal from a first mobile station that its battery power is below a threshold value;

means for changing at the base station a mobile transmission schedule to cause transmission of messages from the first mobile station to occur before transmission of messages from other stations, in response to the signal;

means for scheduling transmissions from low battery power mobile stations to be clustered together in a low-power time slot which is separate in time from scheduled transmissions from high battery power mobile stations;

means for transmitting a power control message to the low battery power mobile stations, to reduce the transmission power required for the low battery power mobile stations during the low-power time slot;

means for transmitting from the base station the schedule to the first and other stations;

said first mobile station having a first high priority message and a first low priority message to transmit and having its battery power below a first threshold value;

means for receiving at a base station a signal from a second mobile station that its battery power is below a second threshold value greater than the first threshold value;

said second mobile station having a second high priority message and a second low priority message to transmit;

said changing means causing transmission of said messages to be ordered with the first high priority, followed by the second high priority, followed by high priority messages from other stations, followed by the first low priority, followed by the second low priority, followed by low priority messages from other stations.

24. A system to manage mobile stations in a wireless network, comprising:

means for receiving at a base station a signal from a first mobile station that its battery power is below a threshold value;

means for changing at the base station a mobile transmission schedule to cause transmission of messages from the first mobile station to occur before transmission of messages from other stations, in response to the signal;

means for scheduling transmissions from low battery power mobile stations to be clustered together in a low-power time slot which is separate in time from scheduled transmissions from high battery power mobile stations;

means for transmitting a power control message to the low battery power mobile stations, to reduce the transmission power required for the low battery power mobile stations during the low-power time slot;

means for transmitting from the base station the schedule to the first and other stations;

said first mobile station having a first high priority message and a first low priority message to transmit and having its battery power below a first threshold value;

means for receiving at a base station a signal from a second mobile station that its battery power is below a second threshold value greater than the first threshold value;

said second mobile station having a second high priority message and a second low priority message to transmit;

said changing means defining at least a portion of a code division multiple access frame with a first time slot for the first high priority message, followed by a second time slot for the second high priority message, followed by a third time slot for the high priority messages from other stations, followed by a fourth time slot for the first low priority message, followed by a fifth time slot for the second low priority message, followed by a sixth time slot for the low priority messages from other stations.

* * * * *